(12) United States Patent
Christy, II et al.

(10) Patent No.: US 12,320,469 B1
(45) Date of Patent: Jun. 3, 2025

(54) ELECTRONIC DEVICE PLATFORM

(71) Applicant: Rose Metal Products, Inc., Springfield, MO (US)

(72) Inventors: Johnny D. Christy, II, Rogersville, MO (US); Arthur C. Pleinis, Highlandville, MO (US); Shannon K. Bollinger, Springfield, MO (US); Rhanger K. Jenkins, Nixa, MO (US)

(73) Assignee: Rose Metal Products, Inc., Springfield, MO (US)

( * ) Notice: Subject to any disclaimer, the term of this patent is extended or adjusted under 35 U.S.C. 154(b) by 0 days.

(21) Appl. No.: 18/367,451

(22) Filed: Sep. 12, 2023

Related U.S. Application Data (63) Continuation-in-part of application No. 29/909,857, filed on Aug. 11, 2023, which is a continuation-in-part of application No. 29/909,842, filed on Aug. 11, 2023.

(51) Int. Cl.
*F16M 11/22* (2006.01)
*B63B 49/00* (2006.01)

(52) U.S. Cl.
CPC .............. *F16M 11/22* (2013.01); *B63B 49/00* (2013.01)

(58) Field of Classification Search
CPC ...... B63B 49/00; B63B 17/00; H05K 5/0217; H04M 1/04; H04M 1/18; F16M 11/18; F16M 11/10; F16M 11/24; F16M 11/38; F16M 13/02; F16M 11/22; F16M 2200/08
USPC ....... 248/688, 676, 677, 678, 371, 158, 159, 248/163.1, 163.2, 172, 174, 188, 188.7, 248/188.8, 300, 346.01, 346.03, 346.06, 248/357, 674; 224/929, 545, 326
See application file for complete search history.

(56) References Cited

U.S. PATENT DOCUMENTS

| | | | | |
|---|---|---|---|---|
| 3,964,612 | A | * 6/1976 | Skilliter, Jr. | ............ B60R 11/02 224/558 |
| 4,097,012 | A | * 6/1978 | McIntyre | ............ B60R 11/0205 224/570 |
| 4,494,754 | A | * 1/1985 | Wagner, Jr. | ............. A63F 13/98 248/176.1 |
| D281,657 | S | * 12/1985 | Roczey | ........................ D14/454 |
| 4,602,761 | A |   7/1986 | Carter | |

(Continued)

OTHER PUBLICATIONS

Rose Metal Products, Trophy Mount Brochure, Oct. 2021, Springfield, Missouri.

*Primary Examiner* — Ingrid M Weinhold
(74) *Attorney, Agent, or Firm* — Carmody MacDonald P.C.; Dennis J M Donahue, III; Kevin C. Staed (57) ABSTRACT

A mount for electronic devices has a base, a platform, a back arm with an upper mounting plate, a front arm with a lower mounting plate, and a conformal support plate that is attached to the platform and at least the back arm. The highest mounting plate is positioned in a plane that is above the platform and is parallel to the plane of the platform. The lower mounting plate may be on the same plane as the platform or it can be in a plane that is between the highest mounting plate and the platform. The mounting plates have different hole patterns that allow the mounting of several different types of gimbal brackets for the electronic devices which allow the electronic devices to be tilted as needed. Wires for the electronic devices can pass through an aperture that extends through the platform and the support plate.

19 Claims, 5 Drawing Sheets

(56) References Cited

U.S. PATENT DOCUMENTS

| | | | |
|---|---|---|---|
| 4,838,508 A * | 6/1989 | Legon | B60R 11/0205 |
| | | | 248/346.03 |
| 4,854,538 A * | 8/1989 | Von Schalscha | B60R 11/02 |
| | | | 248/346.03 |
| 4,880,196 A | 11/1989 | Eichenlaub | |
| 5,174,539 A * | 12/1992 | Leonard | F16M 13/02 |
| | | | 248/300 |
| 5,207,791 A * | 5/1993 | Scherbarth | F16M 11/00 |
| | | | 224/678 |
| 5,417,401 A * | 5/1995 | Thompson | F24F 1/027 |
| | | | 248/300 |
| 6,129,327 A * | 10/2000 | Dubois | F16F 15/08 |
| | | | 248/634 |
| 6,179,253 B1 | 1/2001 | Cotton | |
| 6,322,030 B1 * | 11/2001 | Marra | B63B 17/00 |
| | | | 248/176.1 |
| 7,017,788 B2 * | 3/2006 | Trambley | B60R 9/04 |
| | | | 248/300 |
| 8,262,047 B2 * | 9/2012 | Lindblad | F16M 11/24 |
| | | | 248/162.1 |
| 8,272,675 B2 * | 9/2012 | Fowler | B60K 35/50 |
| | | | 296/70 |
| 8,430,051 B1 | 4/2013 | Allison | |
| 8,746,156 B2 * | 6/2014 | Camarillo | F16M 11/10 |
| | | | 108/150 |
| D730,331 S * | 5/2015 | Wong | D8/355 |
| 9,062,819 B1 * | 6/2015 | Chen | A47B 23/00 |
| 9,549,478 B2 | 1/2017 | Laster | |
| 9,770,956 B2 * | 9/2017 | Dilworth | B60G 11/113 |
| 9,933,109 B2 * | 4/2018 | Moore | F16M 11/08 |
| D869,936 S * | 12/2019 | Smith | D8/349 |
| 10,518,710 B2 | 12/2019 | Nothroff | |
| 11,021,215 B1 | 6/2021 | Price et al. | |
| 11,447,215 B2 | 9/2022 | Housman et al. | |
| D1,035,420 S * | 7/2024 | Hix | D8/380 |
| 2001/0042812 A1 * | 11/2001 | Perzewski | B60R 11/0252 |
| | | | 248/27.1 |
| 2008/0011912 A1 * | 1/2008 | Liao | F16M 11/105 |
| | | | 248/346.06 |
| 2014/0077054 A1 * | 3/2014 | Heyen | F16M 13/00 |
| | | | 248/444 |
| 2015/0240990 A1 * | 8/2015 | Mulhern | F16M 11/06 |
| | | | 248/288.11 |
| 2016/0290554 A1 * | 10/2016 | Saintarbor | B60R 11/00 |

\* cited by examiner

ELECTRONIC DEVICE PLATFORM

CROSS-REFERENCE TO RELATED APPLICATIONS

This application is a continuation-in-part of United States Design patents application Ser. Nos. 29/909,843 and 29/909,857, both of which were filed on Aug. 11, 2023 and which are hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention generally relates to mounting apparatus for electronic equipment and, more particularly, to a strengthened mounting apparatus that is better suited to the harsh conditions that occurs in the marine environment.

Related Art

There are many different types of electronic devices that are used on fishing boats, such as fish finders, GPS, and sonar, and all of these devices should be securely mounted to the boat withstand the harsh conditions that they will be subjected to in the marine environment. Boats and the mounts that hold the electronic devices are subject to significant forces due to the heaving or pounding of the boat over waves and rough water as well as the forces and rotations from maneuvering the boat through the water, including surge (acceleration and deceleration), sway, pitch, roll, and yaw. If the electronic mounts do not have sufficient strength, the repeated stresses placed on the mount's structures can form cracks and may ultimately fail.

It can be particularly challenging to mount these electronic devices at the bow of a boat where many fishing boats have their trolling motors. There is less space available at the bow of the boat so the mount must maximize the use of space. The mounts must also keep a low profile so they do not get in the way of the fishing line, and they also need to be out of the way for foot-controlled trolling motors. Preferably, mounts allow for recessed foot-controlled trolling motors for ease of use with an offset design to allow room for trolling motor clearance. It is also preferable for the mount to clear standard foot pedal trays. The original dual graph Trophy Mounts by Rose Metal Products (standard height and tall) had provided a good design for performance and ergonomics, but there had remained a need for a mount that would have an improved structural integrity and survivability in the harshest environments.

Standard engineering techniques to improve the strength of the mount yield unsatisfactory results. For example, merely changing the material from aluminum to a stronger, more durable material, such as stainless steel or titanium or possibly a non-metallic composite material, would be impractical due to the increase in the cost of the materials and the manufacturing techniques required. Beginning with a thicker sheet of aluminum from the quarter inch (¼") sheet would also result in significantly higher costs and would bulk up sections of the mount that do not require the thicker material.

Accordingly, there remains a need for an improved mounting apparatus which can withstand the harsh conditions that occurs in the marine environment while also providing a good design for performance and ergonomics.

SUMMARY OF THE INVENTION

In one aspect of the invention, a mount for electronic devices has a base, a platform, a back arm with an upper mounting plate, a front arm with a lower mounting plate, and a conformal support plate that is attached to the platform and at least the back arm. The highest mounting plate is positioned in a plane that is above the platform and is parallel to the plane of the platform. The lower mounting plate may be on the same plane as the platform or it can be in a plane that is between the highest mounting plate and the platform. The mounting plates have different hole patterns that allow the mounting of several different types of gimbal brackets for the electronic devices which allow the electronic devices to be tilted as needed. Wires for the electronic devices can pass through an aperture that extends through the platform and the support plate.

In another aspect of the invention, the sections of the support plate that span the platform, the back arm, and the front arm do not extend beyond the platform or the arms to the base or to the upper and lower mounting plates.

In yet another aspect of the invention, the sections of the support plate that span the platform and the back arm do not extend beyond the platform or the arm to the base or to the upper mounting plate, but the front section of the support plate spans the front arm and extends at least partially over the front arm.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings as briefly described below.

DETAILED DESCRIPTION OF THE PREFERRED EMBODIMENTS

The following description of the preferred embodiment(s) is merely exemplary in nature and is in no way intended to limit the invention, its application, or uses.

As shown in the accompanying drawings, a mount 10 for electronic devices 100 has a base 24, a platform 12, an upper mounting plate 18 connected to a back arm 14, a lower mounting plate 20 connected to a front arm 16, and a support plate 22 that is conformal with the platform and both arms and is fixedly attached to at least the platform and the back arm. The base extends from a bottom section 32a to a top section 32b, and the platform is connected to the top section of the base. The platform is situated in a plane $P_P$ that is immediately above the top section of the base. Each one of the mounting plates has a set of mounting holes 38a, 38b that provide different hole patterns which allow the mounting of several different types of gimbal brackets 110 for the electronic devices. An aperture 26 extends through the platform and a center section of the support plate, and a flexible grommet 28 is secured to the sidewalls of the platform and the support plate around the aperture. Wires 120 for the electronic devices can pass through the aperture, and the grommet helps protect the wires from chafing.

The support plate's center section 30a and back section 30b span the platform 12 and the back arm 14, respectively, and do not extend beyond the platform or the back arm to the base or to the upper mounting plate. The support plate's center section is preferably fastened to the platform with one set of rivets 40a, and the support plate's back section is preferably fastened to the back arm with another set of rivets 40b. In the standard height embodiment for the mount that is shown in FIGS. 1-4, the support plate's front section 30c' spans the front arm and is fixedly attached to the front arm with yet another set of rivets 40c. In this embodiment, the front section does not extend past the front arm to the lower mounting plate. In the tall height embodiment for the mount that is shown in FIGS. 5-8, the support plate's front section 30c" not only spans the front arm, it extends beyond the front arm to be at least partially over the lower mounting plate, and in this embodiment, the front section has a set of holes 50 that are aligned with the set of holes 38b in the lower mounting plate.

In both embodiments of the mount, the base, the platform, the back arm, the front arm, the upper mounting plate, and the lower mounting plate are preferably formed from a single, laser-cut sheet of aluminum 42 that has a quarter inch (¼") thickness. The base is preferably formed as a pair of legs 24a, 24b that extend downward from radius bends 48a, 48b in the top section on opposite side ends of the platform to feet 46a, 46b extending outwardly at radius bends at the bottom section. The legs preferably have a curved front edge 36a and a curved back edge 36b that increase in slope relative to the horizontal plane PH, from an acute angle (da) at the bottom section to a nearly perpendicular angle (ap) at the top section. The back arm 14 extends upward away from the base to its upper end, extending from the radius bend 44a in its lower end at the back side 34a of the platform 12. The upper mounting plate extends back from a radius bend [44c] in the back arm's upper end and is located in an upper plane Pu situated above and substantially parallel to the platform's plane.

In the standard height embodiment, the front arm 16 extends upward away from the base to its upper end, extending from the radius bend 44b in its lower end at the front side 34b of the platform 12. In this embodiment, the lower mounting plate extends forward from a radius bend [44d] in the front arm's upper end and is located in a lower plane $P_L$ that is parallel to and situated between the upper plane Pu and the platform's plane $P_P$. In the tall height embodiment, the front arm and the lower mounting plate extend straight forward from the front side of the platform in the platform's plane. Accordingly, in the tall height embodiment, there is no radius bend between the platform and the front arm or between the front arm and the lower mounting plate. The radius bends are preferably formed using a press brake machine. The lengths of the radius bends (lRB) for the legs and arms are preferably coextensive with the lengths of the platform's sides from which they extend. Similarly, the lengths of the radius bends for the mounting plates and the feet preferably coextensive with the lengths of the arms and the legs, respectively. When the bending operations are complete for the aluminum sheet, a textured powder coat layer is applied to the surfaces.

The support plate is preferably formed from a single sheet of metal 30, preferably twelve gauge (12 ga) stainless steel, which has a thickness (tss) a little over one tenth of an inch (approximately .105"). The support plate is a little less than half the the thickness of the aluminum sheet (tAL) but provides similar strength as the quarter inch (¼") aluminum sheet of metal. Similar to the bends made in the aluminum sheet, the support plate is bent into a shape that conforms with the platform and the arms. For the standard height embodiment, there are two (2) bends 30d, 30e in the support plate on opposite sides of the center section. For the tall height embodiment, the support plate only has a single bend. As explained above, the support plate preferably does not extend beyond any of the arms that bend upward from the platform, but it extends beyond the short front arm and lower mounting plate in the tall height embodiment which extend straight out from the platform. Generally, the total length of the support plate, spanning the sections on opposite sides of the center section, is shorter than the aluminum structure that extends out to both mounting plates on opposite sides of the platform. The shorter support plate helps to reduce the cost and the weight of the mount, and it will be appreciated that the support plate could extend all the way out to the ends of the mounting plates.

Figure 1:
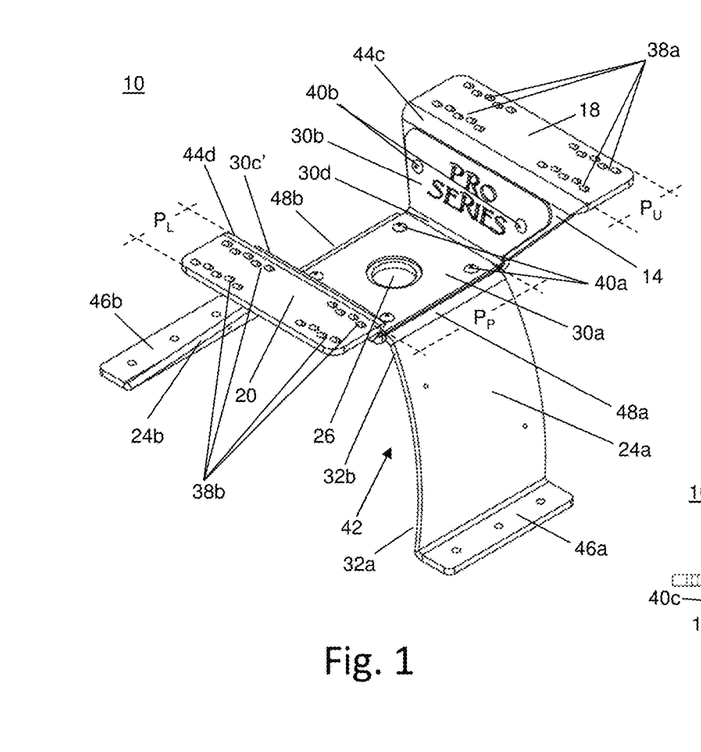
FIG. 1 is a perspective view of an embodiment of a mount according to the present invention.
Figure 2:
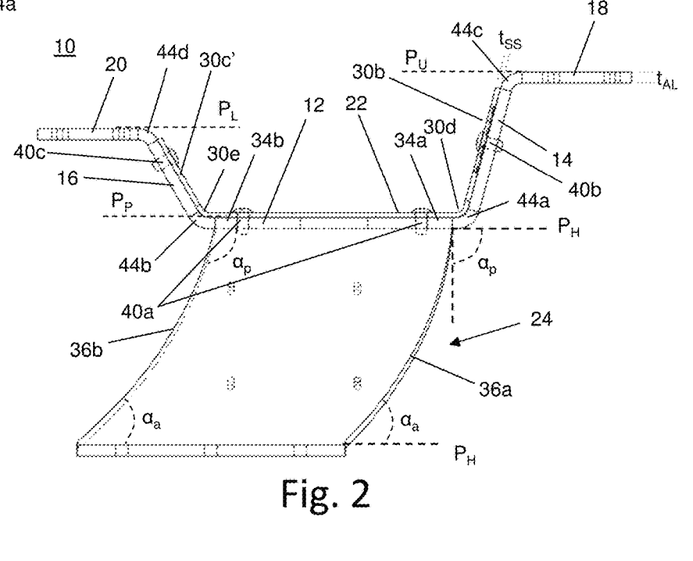
FIG. 2 is a side view of the invention shown in FIG. 1.
Figure 3:
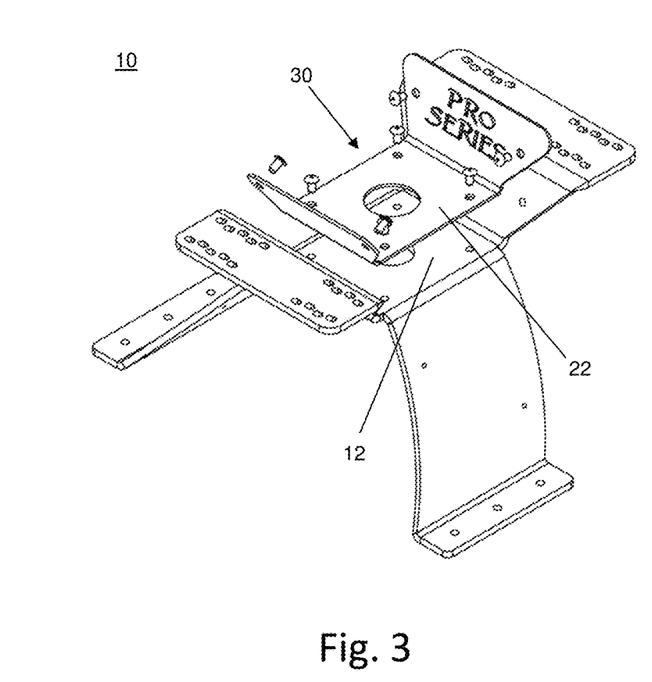
FIG. 3 is a perspective exploded view of the invention shown in FIG. 1.
Figure 4:
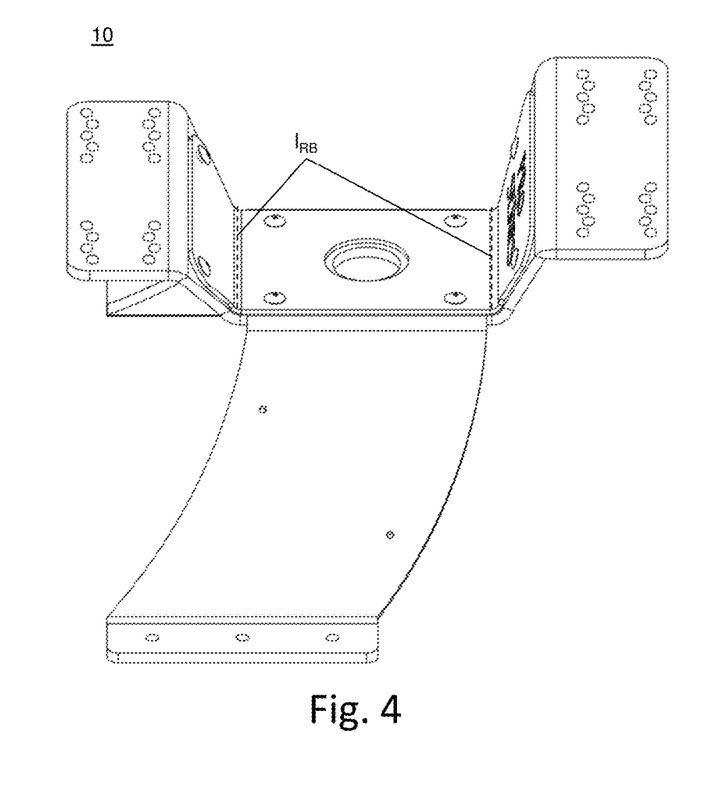
FIG. 4 is a side perspective view of the invention shown in FIG. 1.
Figure 5:
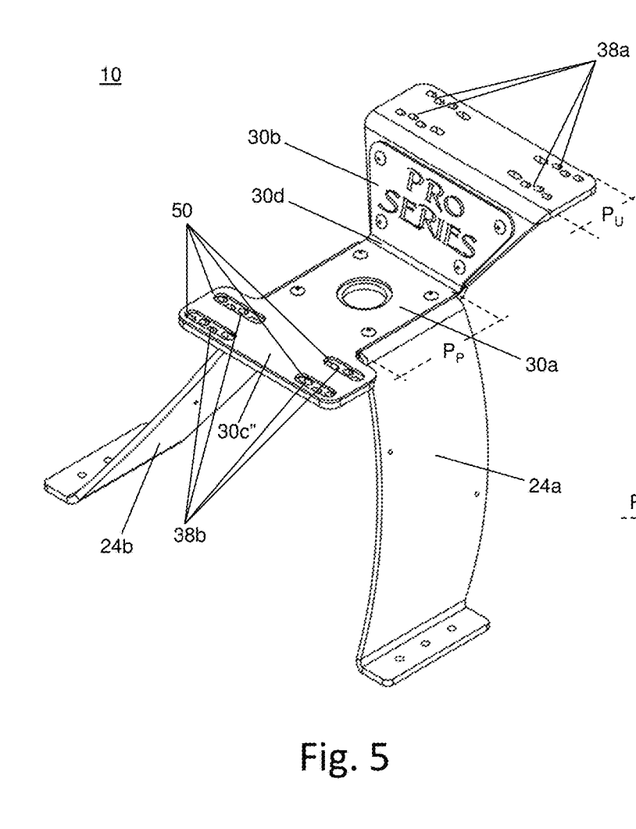
FIG. 5 is a perspective view of another embodiment of a mount according to the present invention.
Figure 6:
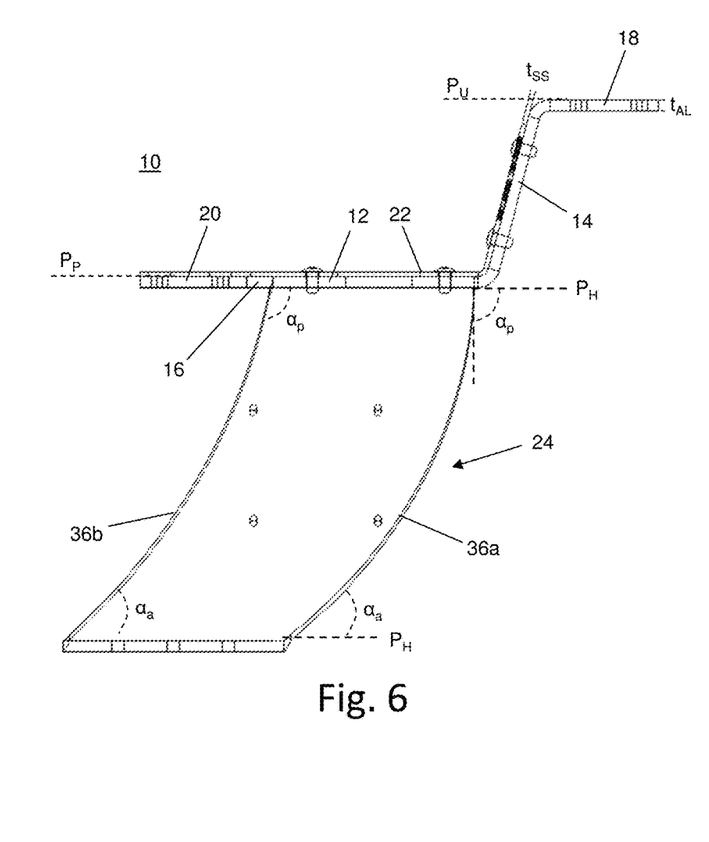
FIG. 6 is a side view of the invention shown in FIG. 5.
Figure 7:
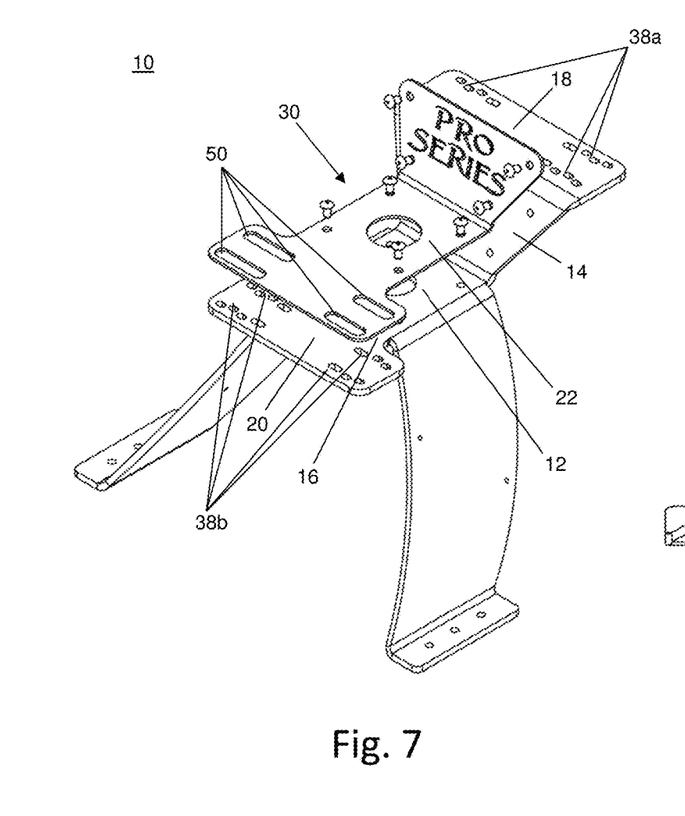
FIG. 7 is a perspective exploded view of the invention shown in FIG. 5.
Figure 8:
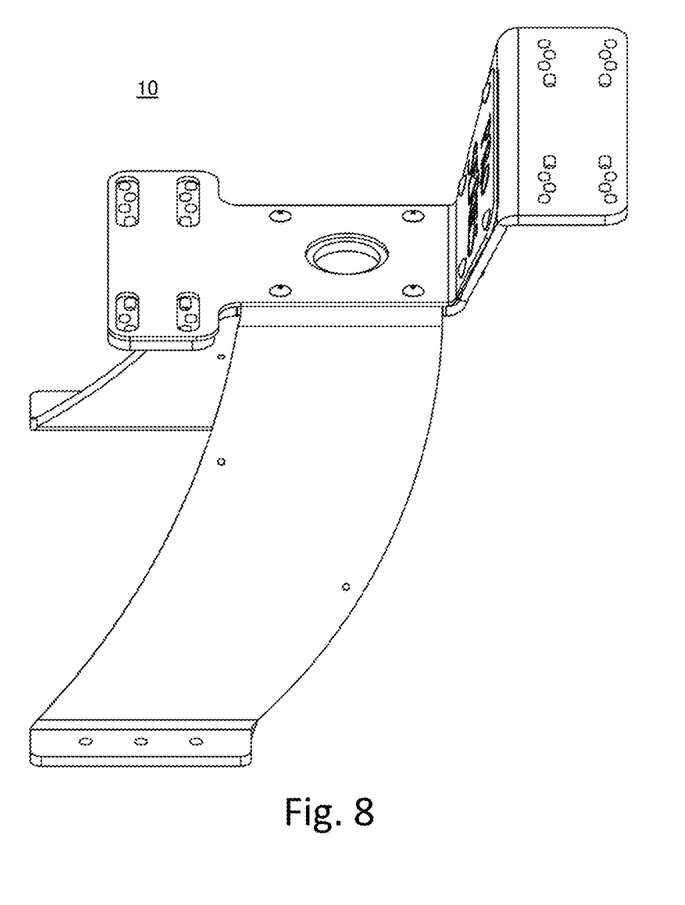
FIG. 8 is a side perspective view of the invention shown in FIG. 5.
Figure 9:
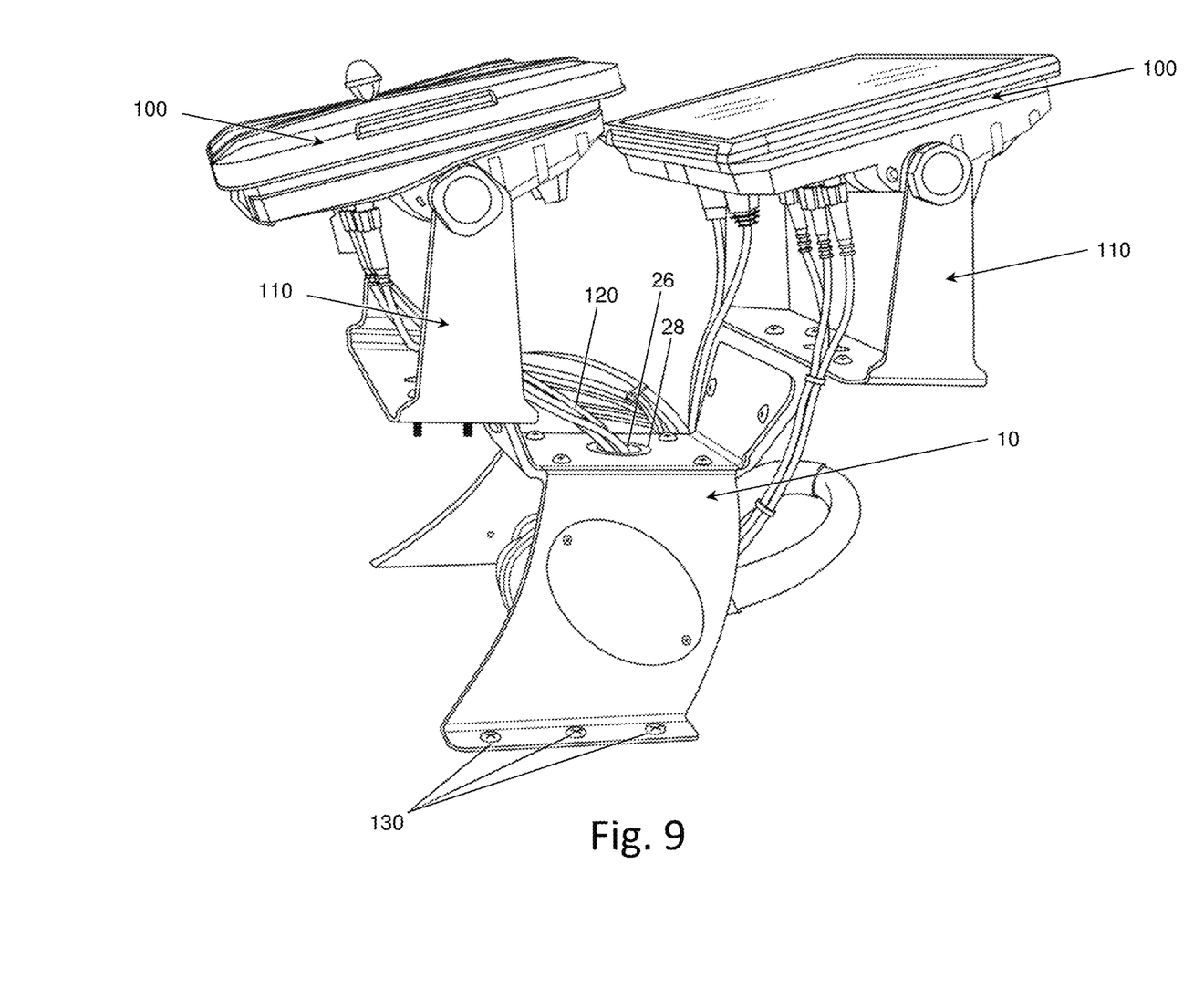
FIG. 9 is a perspective view of the invention shown in FIG. 1 as installed on a boat with gimbals and electronic devices.

The mount is shown in FIG. 9 along with gimbal brackets 110 and electronic devices 100 tilted toward the person positioned at the front of the mount. The mount is secured to the frame or deck of the boat with fasteners 130 that extend through holes in the feet, preferably nut and bolt fasteners. The positions of the front arm and the back arm are based on their position relative to the person who is viewing the electronic devices; the front arm is the arm that is proximate to the person while the back arm is the arm that is distal from person and is closer to the bow of the boat. The curvature of the legs with a slope toward the bow of the boat at their bottom section and then increasing in slope to the top section allows for better clearance at the deck of the boat as compared with the straight, single-slope legs in the original dual graph Trophy Mounts.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, rather than using a pair of legs as the base in the present invention, the base could be formed by a pedestal which could have a fixed height or may be telescopic for an adjustable height, such as disclosed in U.S. Pat. Nos. 8,430,051 and 11,021,215 which are incorporated by reference herein. As another example, the base could have other mechanisms to provide an adjustable height, such as U.S. Pat. No. 11,447,215 which is also incorporated by reference herein. Thus, the breadth and scope of the present invention should not be limited by any of the above-described exemplary embodiments, but should be defined only in accordance with the following claims appended hereto and their equivalents.

What is claimed is:

1. A mount for electronic devices, comprising:
   a base extending from a bottom section to a top section;
   a platform connected to the top section of the base, wherein the platform is situated in a first plane above the top section of the base;
   a first arm connected to and extending from a first side of the platform, wherein the first arm extends upward from the first plane away from the base to an upper end;
   a first mounting plate connected to the first arm at the upper end, wherein the mounting plate is situated in a second plane above the first plane; and
   a support plate fixedly attached to the platform and the first arm, wherein the support plate is formed from a single sheet of metal and is comprised of a first section, a second section, and a first bend between the first section and the second section, wherein the first section is conformal with the platform, wherein the second section is conformal with the first arm, and wherein the first bend is aligned with the first side of the platform where the first arm extends upward from the first plane.

2. The mount of claim 1, wherein the base further comprises a pair of legs, wherein opposite ends of the platform are connected to the legs, wherein each one of the legs is comprised of a curved first edge and a curved second edge, and wherein the curved first edge and the curved second edge increase in slope as they extend from the bottom section to the top section.

3. The mount of claim 1, further comprising a second arm connected to and extending from a second side of the platform, wherein the first mounting plate further comprises a first set of mounting holes, and wherein the support plate further comprises a third section extending past the second side of the platform and spans the second arm.

4. The mount of claim 3, further comprising a second mounting plate connected to the second arm, wherein the second plane is substantially parallel to the first plane, wherein the second mounting plate is situated in a third plane below the second plane, wherein the first section and the second section of the support plate respectively span the platform and the first arm and do not extend beyond the platform or the first arm to the base or to the first mounting plate, and wherein a length of the first bend is coextensive with the first side of the platform.

5. The mount of claim 1, wherein a lower end of the first arm is fixedly attached to the first side of the platform, wherein the first section of the support plate is fixedly attached to the platform on one side of the first bend in the support plate, and wherein the second section of the support plate is fixedly attached to the first arm between the lower end and the upper end on another side of the first bend in the support plate.

6. The mount of claim 4, wherein the third plane is above the first plane, wherein the second arm extends upward from the first plane to the second mounting plate in the third plane, wherein the support plate further comprises a second bend between the first section and the third section, and wherein the third section of the support plate does not extend to the second mounting plate.

7. The mount of claim 6, wherein the first section of the support plate is fastened to the platform with a first set of rivets, wherein the second section of the support plate is fastened to the first arm with a second set of rivets, and wherein the third section of the support plate is fastened to the second arm with a third set of rivets.

8. The mount of claim 6, wherein the second bend is aligned with the second side of the platform where the second arm extends upward from the first plane.

9. The mount of claim 6, wherein the base, the platform, the first arm, the second arm, the first mounting plate, and the second mounting plate are formed from a single laser-cut sheet of aluminum, wherein the first arm is further comprised of a third bend extending to the first mounting plate, wherein the second arm is further comprised of a fourth bend extending to the second mounting plate, wherein the first bend, the second bend, the third bend, and the fourth bend are formed by a press brake bending, wherein the single sheet of metal forming the support plate is stainless steel, and wherein a thickness of the stainless steel support plate is less than one half a thickness of the laser-cut sheet of aluminum.

10. The mount of claim 1, further comprising an aperture extending through the platform and the first section of the support plate and a flexible grommet secured to the platform and the support plate at sidewalls around the aperture.

11. A mount for electronic devices, comprising:
    a base extending from a bottom section to a top section;
    a platform connected to the top section of the base, wherein the platform is situated in a first plane above the top section of the base;
    a first arm connected to and extending from a first side of the platform, wherein the first arm extends upward from the first plane away from the base;
    a first mounting plate connected to the first arm, wherein the first mounting plate comprises a first set of mounting holes;
    a second arm connected to and extending from a second side of the platform;
    a second mounting plate connected to the second arm, wherein the second mounting plate comprises a second set of mounting holes;
    a support plate fixedly attached to the platform and to at least one of the first arm and the second arm, wherein the support plate is formed from a single sheet of metal and is comprised of a first section, a second section, a third section, and a first bend between the first section and the second section, wherein the first section is conformal with the platform, wherein the second section is conformal with the first arm, wherein the third section is conformal with the second arm, and wherein the first bend is aligned with the first side of the platform where the first arm extends upward from the first plane.

12. The mount of claim 11, wherein the first section and the second section of the support plate respectively span the platform and the first arm and do not extend beyond the platform or the first arm to the base or to the first mounting plate, and wherein a length of the first bend is coextensive with the first side of the platform.

13. The mount of claim 11, wherein the second arm and the second mounting plate extend outward in the first plane to the second mounting plate, and wherein the third section of the support plate spans the second arm and extends at least partially over the second mounting plate and comprises a set of holes aligned with the second set of holes in the second mounting plate.

14. The mount of claim 11, wherein the second arm extends upward from the first plane to the second mounting plate, wherein the support plate further comprises a second bend between the first section and the third section, and wherein the third section of the support plate is fixedly attached to the second arm.

15. The mount of claim 11, further comprising an aperture extending through the platform and the first section of the support plate and a flexible grommet secured to the platform and the support plate at sidewalls around the aperture, wherein the base further comprises a pair of legs, wherein opposite ends of the platform are connected to the legs, wherein each one of the legs is comprised of a curved first edge and a curved second edge, and wherein the curved first edge and the curved second edge increase in slope as they extend from the bottom section to the top section.

16. A platform for electronic devices, comprising:
   a base extending from a bottom section to a top section;
   a platform connected to the top section of the base, wherein the platform is situated in a first plane above the top section of the base;
   a first arm connected to and extending from a first side of the platform, wherein the first arm extends upward from the first plane away from the base;
   a first mounting plate connected to the first arm, wherein the first mounting plate comprises a first set of mounting holes;
   a second arm connected to and extending from a second side of the platform;
   a second mounting plate connected to the second arm, wherein the second mounting plate comprises a second set of mounting holes;
   a support plate formed from a single sheet of metal and comprised of a first section, a second section, a third section, and a first bend between the first section and the second section, wherein the first section is fixedly attached to and conformally spans the platform and does not extend beyond the platform to the base, wherein the second section is fixedly attached to the first arm and conformally spans the first arm and does not extend beyond the first arm to the first mounting plate, wherein the third section conformally spans the second arm, and wherein the first bend is aligned with the first side of the platform where the first arm extends upward from the first plane.

17. The mount of claim 16, wherein the second arm and the second mounting plate extend outward in the first plane to the second mounting plate, and wherein the third section of the support plate extends at least partially over the second mounting plate and comprises a set of holes aligned with the second set of holes in the second mounting plate.

18. The mount of claim 16, wherein the second arm extends upward from the first plane to the second mounting plate, wherein the support plate further comprises a second bend between the first section and the third section, and wherein the third section of the support plate is fixedly attached to the second arm and does not extend over the second mounting plate.

19. The mount of claim 16, further comprising an aperture extending through the platform and the first section of the support plate and a flexible grommet secured to the platform and the support plate at sidewalls around the aperture, wherein the base further comprises a pair of legs, wherein opposite ends of the platform are connected to the legs, wherein each one of the legs is comprised of a curved first edge and a curved second edge, and wherein the curved first edge and the curved second edge increase in slope as they extend from the bottom section to the top section.

\* \* \* \* \*